(12) United States Patent
Kamgar-Parsi et al.

(10) Patent No.: US 7,684,595 B2
(45) Date of Patent: Mar. 23, 2010

(54) METHOD OF FACIAL RECOGNITION

(75) Inventors: Behrooz Kamgar-Parsi, Silver Spring, MD (US); Behzad Kamgar Parsi, Vienna, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 854 days.

(21) Appl. No.: 11/426,093

(22) Filed: Jun. 23, 2006

(65) Prior Publication Data

US 2007/0297650 A1 Dec. 27, 2007

(51) Int. Cl.
G06K 9/00 (2006.01)
(52) U.S. Cl. ...................................... 382/118
(58) Field of Classification Search ................. 382/100, 382/115, 116, 117, 118, 123, 128, 151, 155, 382/156, 157, 158, 159, 165, 181, 199, 224, 382/226, 254, 266; 706/15, 16, 20, 26, 41, 706/38, 39
See application file for complete search history.

(56) References Cited

U.S. PATENT DOCUMENTS

| | | | |
|---|---|---|---|
| 5,923,776 A * | 7/1999 | Kamgar-Parsi | 382/173 |
| 2003/0063780 A1* | 4/2003 | Gutta et al. | 382/118 |
| 2005/0036676 A1* | 2/2005 | Heisele | 382/159 |
| 2005/0105780 A1* | 5/2005 | Ioffe | 382/118 |
| 2006/0126939 A1* | 6/2006 | Park et al. | 382/190 |

OTHER PUBLICATIONS

Moghaddam et al., "Bayesian face recognition", Pattern Recognition, 33 (2000) 1771-1782.*
Alan L. Yuille, "Deformable Templates for Face Recognition", Journal of cognitive neuroscience, Winter 1991, vol. 3, No. 1, pp. 59-70.*
Chellapp, R.,"Human and Machine Recognition of Faces: A Survey", Proceedings of the IEEE, vol. 83, No. 5, May 1995.
Kamgar-Parsi, B.,"Aircraft Detection: A Case Study in Using Human Similarity Measure", IEEE Transactions on Pattern Analysis and Machine Intelligence, vol. 23, No. 12, Dec. 2001.

* cited by examiner

*Primary Examiner*—Andrew W Johns
*Assistant Examiner*—Tahmina Ansari
(74) *Attorney, Agent, or Firm*—John J Karasek; Suresh Koshy

(57) ABSTRACT

An original image of a target is provided. The original image is guidedly perturbed into a first plurality of recognizable uniquely perturbed images, each of the first plurality of recognizable uniquely perturbed images being recognizable as representing the target and distinguishable from the original image. The first plurality of recognizable uniquely perturbed images is guidedly perturbed into a second plurality of unrecognizable uniquely perturbed images, each of the second plurality of unrecognizable uniquely perturbed images being unrecognizable as representing the target. A contour is generated between the first plurality of recognizable uniquely perturbed images and the second plurality of unrecognizable uniquely perturbed images.

18 Claims, 3 Drawing Sheets

METHOD OF FACIAL RECOGNITION

TECHNICAL FIELD

This invention relates to a method of facial recognition, and more particularly, to a method of facial recognition having a human-like discriminative capability or similarity measure.

DESCRIPTION OF RELATED ART

Commercially available facial recognition systems, such as the FaceIt® system by Visionics Corp., now merged into Identix Inc., an the Viisage system, are commonly not adequate for fully automated applications. Typical systems narrow a search space, but leave the final decision to a human operator. This is because human ability for facial recognition is far superior to existing facial recognition systems.

The crucial step in facial recognition is the ability to compare images. That is, the system must correctly determine whether a test image and a database image belong to the same person. Existing techniques use metric similarity measures ("MSM"), e.g., Euclidean and principal component analysis.

MSM often produce erroneous results because they describe the dis-similarity to two visual patterns by a single number. Shapes are complex objects in high dimensional spaces; to describe their differences by single numbers amounts to projecting them into one-dimensional spaces. Hence, the descriptions will not remain separated for distinct visual patterns. Despite these limitations, MSM are used extensively in the field of computer vision because of a lack of better alternatives.

Psychophysics literature has been critical of metric similarity measure for shape comparison, but has not offered any alternative solution thereof. Explicit awareness about the inadequacies of MSM in the machine (computer) vision literature is rare. For example, according to Chellappa et al., "Human and machine recognition of faces: a survey," Proceedings of IEEE, Vol. 83, pp. 705-741, 1995, incorporated herein by reference, "The similarity measure used in a face recognition system should be designed so that humans' ability to perform face recognition and recall are imitated as closely as possible by the machine. As of this writing no such evaluation of a face recognition system has been reported in the literature." However, Chellapa et al. fail to identify how such imitation should be implemented.

SUMMARY OF THE INVENTION

An embodiment of the inventive method is defined as follows. An original facial image of a target is provided in step (a). The original image is guidedly perturbed into a first plurality of recognizable uniquely perturbed images, each of the first plurality of recognizable uniquely perturbed images being recognizable as representing the target and distinguishable from the original image in step (b). The first plurality of recognizable uniquely perturbed images, or the original image itself, is guidedly perturbed into a second plurality of unrecognizable uniquely perturbed images, each of the second plurality of unrecognizable uniquely perturbed images being unrecognizable as representing the target in step (c). A contour is generated between the first plurality of recognizable uniquely perturbed images and the second plurality of unrecognizable uniquely perturbed images in step (d). The original image is guidedly perturbed to generate a plurality of recognizable test set images. A plurality of unrecognizable test set images is generated by one of guidedly perturbing the plurality of acceptable test set images, and guidedly perturbing the original image. Whether the contour excludes the test image of the non-target and includes the test image of the target is determined in step (e). Optionally, the method further includes the following step. A plurality of training images is provided, wherein the guidedly perturbing step (c) is performed using the plurality of training images, and the guidedly perturbing step (d) is performed using the plurality of training images. Optionally, if the contour fails to one of exclude the test image of the non-target and include the test image of the target, the method includes the following steps. A number of the original image of the target is increased, and steps (c) through (f) are repeated. Optionally, if the contour fails to one of exclude the test image of the non-target and include the test image of the target, the method includes the following steps. A number of the plurality of training images is increased, and steps (c) through (f) are repeated.

Optionally, the generated step (e) includes training a classifier to define the contour. Optionally, the determining step (f) includes testing the classifier. Optionally, the test image of the target includes a plurality of test images of the target, and the repeating step includes the step of repeating the training the classifier step and the testing the classifier step until the classifier correctly accepts one of a number and a percentage of the plurality of test images of the target. Optionally, the test image of the target comprises a plurality of test images of the target, and the repeating step (g) includes the step of repeating the training the classifier step and the testing the classifier step until the classifier correctly accepts one of a number and a percentage of the plurality of test facial images of the target.

Optionally, the classifier comprises, for example, a neural network, a support vector machine, etc.

Optionally, the target is a person, and the original image of the target comprises a portion of the person. Optionally, the portion of the person includes a face or a portion thereof.

BEST MODE FOR CARRYING OUT THE INVENTION

Figure 1:
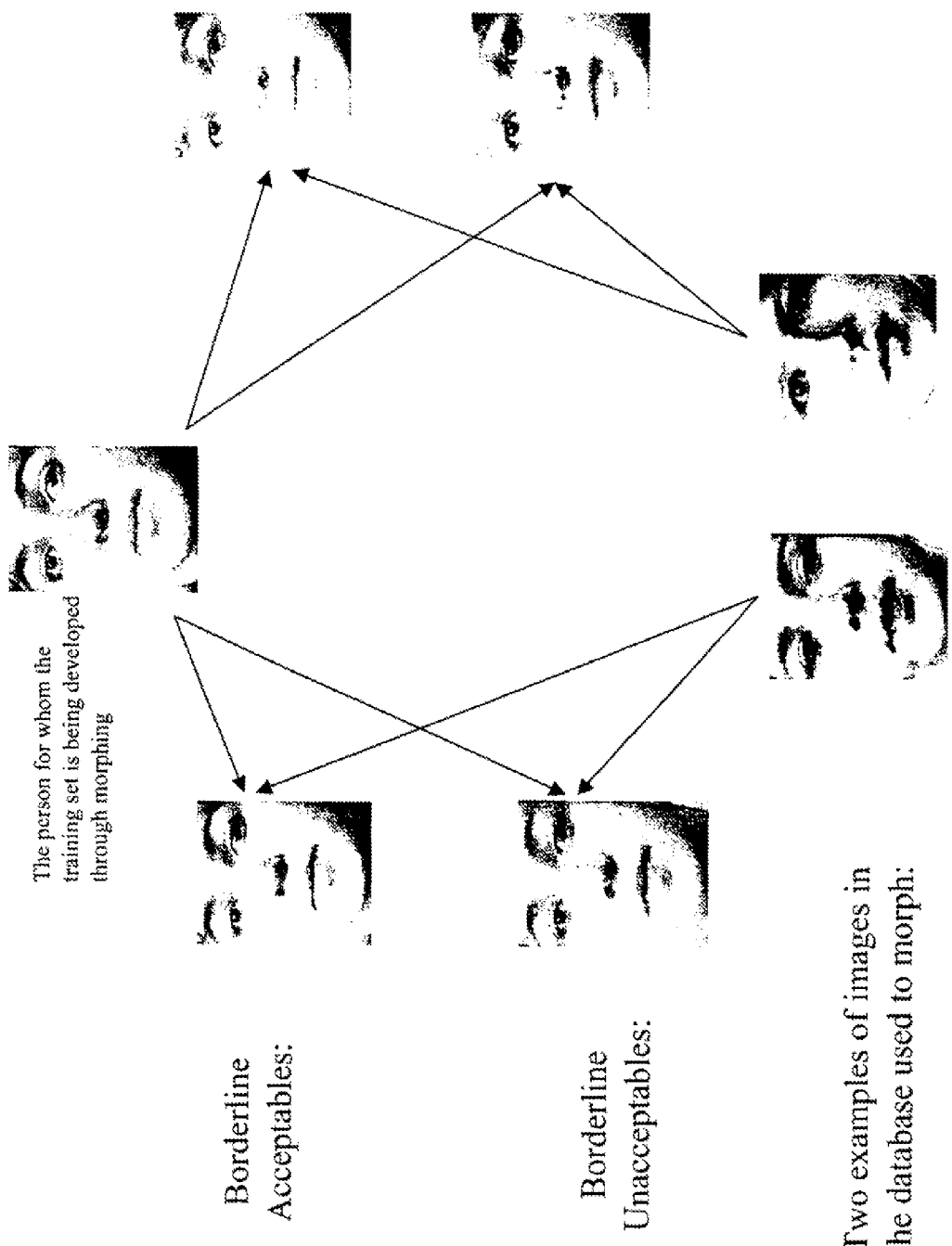
FIG. 1 is an illustrative relational diagram showing an original image of a target, two training images, two borderline acceptable images generated from the original image of the target and the two training images, and two borderline unacceptable images generated from the original image of the target and the two training images.

The method according to the instant invention facilitates deployment of a human-like classification/recognition capability in an automated system for recognizing faces. At the outset, for ease of explanation, the description will concentrate on a face recognition system for a single target person. However, it is, of course, recognized that the instant system is scalable to accommodate more than one target. Accordingly, the extension of the invention to embodiments accommodating multiple targets at the end of the description.

Let H denote a human critic or expert, and $I_0$ the image of a target person, P. If image $I_0$ is guidedly perturbed toward an image $I_1$ of another person, and the degree of perturbation is sufficiently small, then the perturbed image of $I_0$ would still be recognizable as representing the target P to the expert H. If the perturbed image of $I_0$ is further guidedly perturbed toward $I_1$ by increasing the degree of perturbation, then eventually the perturbed image would not look sufficiently like the target P to the expert H. Indeed, increased guided perturbation of the perturbed image will make the image even less like the target P to the expert H. Hence, in the face/image space, there is a region R containing $I_0$ such that faces/images within it are considered acceptable matches of the target P, and that faces/images outside of it are considered unacceptable images of the target P to the expert H. The region R is enclosed by a boundary or contour M, where M is the manifold of borderline images, i.e., images that the expert H could consider both possibly acceptable and possibly unacceptable images of the target P. Once the contour M is determined, any image inside M is regarded as acceptable and belonging to the target P. Otherwise, it will be rejected as not belonging to the target P.

If a dense set of borderline images is available, the contour M is constructed by fitting, for example, a plurality of hyperplanes to data points representing borderline images in the face/image space. The necessary density typically is not universally fixed for all targets, but rather depends on the number and variety of images required to ascertain the contour M for a given target. Equivalently, for two dense sets of images of a target, one composed of borderline acceptable images (e.g., projecting just inside the contour M) and the other composed of borderline unacceptable images (e.g., projecting just outside the contour M), the two sets are optionally used to train a neural network or other classifier such that the constructed decision boundary will provide a practical approximation to M. The classification of facial images by the classifier/neural network, as belonging or not belonging to the imaged target will then be in good agreement with the expert H.

To generate a desired training set, photo $I_0$ of the target P is guidedly perturbed toward that of another person to the extent that it becomes borderline recognizable to a human supervisor H for borderline recognizable images and borderline unrecognizable to the human supervisor H for borderline unrecognizable images. An example of a method of guidedly perturbing is morphing. That is, for example, the image of the target is morphed toward those of other people.

Figure 3:
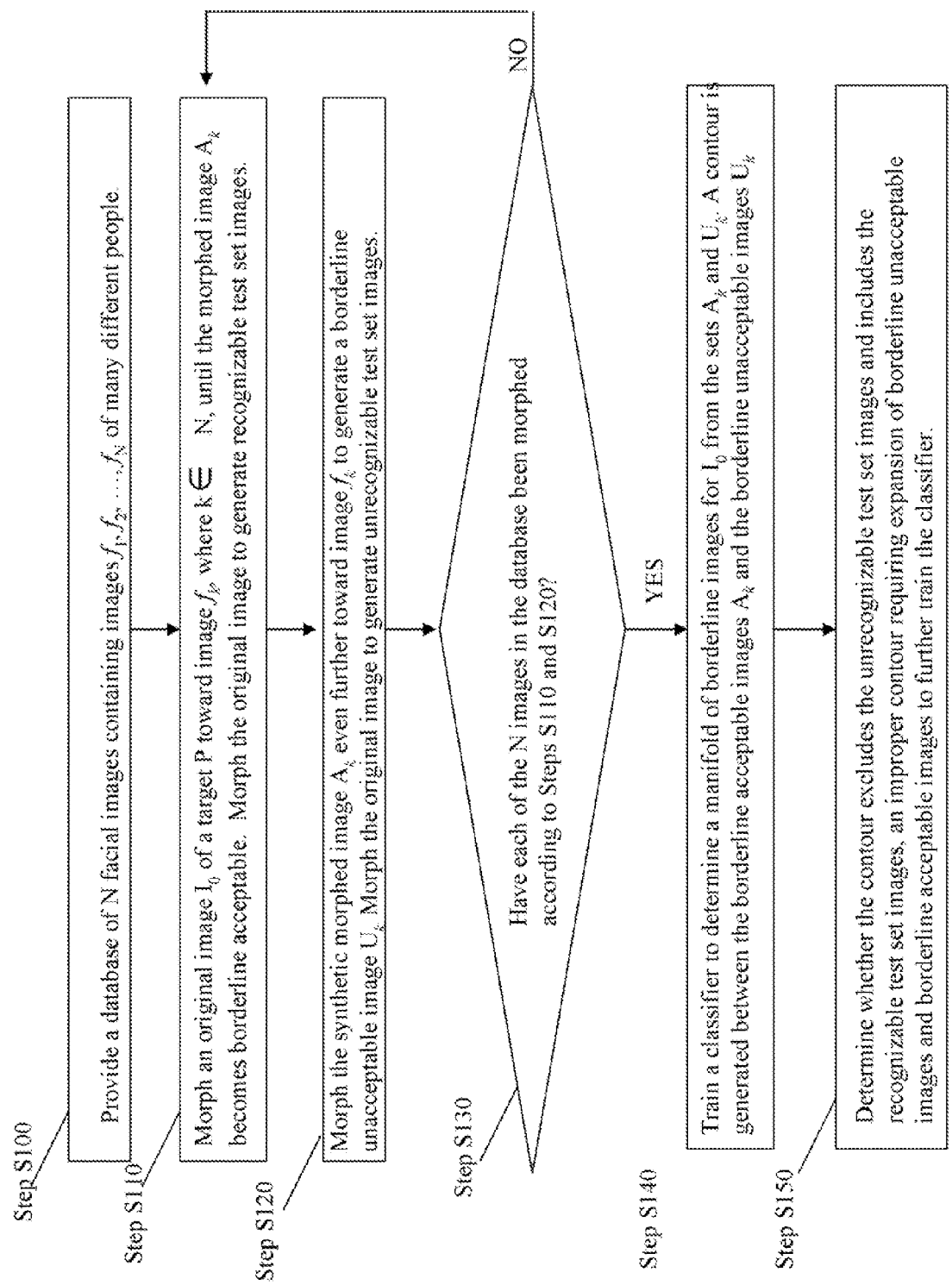
FIG. 3 is a flow chart of an embodiment of the instant invention.

According to an embodiment of the invention, such as shown in FIG. 3, in Step S100 a database of N facial images containing images $f_1, f_2, \ldots, f_N$ of a number of different people is provided. In Step S110, an original image $I_0$ of a target P is morphed toward images $f_k$, where k∈N, until the morphed image $A_k$ becomes borderline acceptable. That is, synthetic image $A_k$ is significantly different from original image $I_0$ of the target P, yet still recognizable as belonging to target P to the expert H, who serves as a teacher for the classifier. Then, in Step S120, the synthetic morphed image $A_k$ is morphed even further toward image $f_k$ to generate a borderline unacceptable image $U_k$. $U_k$ is considered, for instance, an image of a look-alike person of target P. That is, the borderline unacceptable image $U_k$ looks to some extent like an image of the target P, but the resemblance according to, for example, expert H, will be inadequate. In Step S130, Steps S100-S120 are repeated for all of the N images in the database of facial images. Step S130 nets N borderline acceptable images and N borderline unacceptable images. In Step S140, a classifier is trained to determine a manifold of borderline images for $I_0$ from the sets $A_k$ and $U_k$.

Optionally, after Step S100, each image $f_k$, is morphed part-way (e.g., half-way) toward another image in the image database, thereby generating additional database images (e.g., $N^2$ images for the half-way morphing example). As an alternative option, one or more parts of each image $f_k$, is morphed toward another image in the image database, thereby generating additional database images. As another alternative option, after Step S100, each image $f_k$, is morphed away from another image in the image database, thereby generating additional database images. Morphing away, for example, exaggerates one or more features in original image $I_0$ that are very distinct, thereby making the training set for the classifier more rich than simply working with the original set of N database images. As yet another alternative option, after Step S100, each image $f_k$, is morphed toward and/or away from a plurality of images in the image database, thereby generating additional database images.

Optionally, a new set of images are generated, which set comprises images that are recognizable as representing the target. The classifier then is optionally tested to determine whether it properly includes each of the recognizable images within the contour or manifold. Optionally, another set of images are generated, which set comprises images that are unrecognizable as representing the target. The classifier then is optionally tested to determine whether it properly excludes each of the recognizable images within the contour or manifold.

Another embodiment of the invention, with reference to FIG. 1, is described as follows. An original image $I_0$ is provided of a target, such as a frontal facial view of a person P. An example of the image $I_0$ is provided at the top-most of FIG. 1.

In another embodiment of the invention, a plurality of original images are used, e.g., each image having a slightly different pose or lighting. In practice, if the desired training set of images of the target described above is not available, the required images must by synthetically generated, for example, as follows. For instance, such synthetic generation of the training set involves incorporating natural variation in the appearance of the target, for example, accounting for a change in expression, lighting, or pose for a human target. For example, eleven original images, each image including at least a portion of a near frontal image of a target's face. In such an example, each such original image shows a different angle of the portion of the target's face for a system designed to recognize frontal views.

A database of training images is provided. Each training image in the training database is, for example, characterized as $D^{TR}_j, j \in N^{TR}$, where $N^{TR}$ is the number of training database images allocated for training a classifier. Two examples of training images are given in the bottom row of pictures of FIG. 1.

A database of testing images is provided. Each testing image is, for example, an original image of the target not used during training or a synthetically generated testing image based on an original image of the target, for example, with a different lighting, different pose, and/or different expression to capture natural variation in appearance of the target. Such recognizable testing images are called positive testing examples. By way of contrast, negative testing examples are images of other people. Each testing image in the testing database is, for example, characterized as $D^{TS}_j, j \in N^{TS}$, where $N^{TS}$ is the number of testing database images allocated for testing the classifier. A morphing operator $M_i$, i ∈2 is provided such that the morphing operator $M_1$ morphs toward a given image, and $M_2$ morphs away a given image.

A set $S^A$ of generated images, which is developed to be mostly borderline acceptable or recognizable by an expert H, such as a training operator or one who can easily recognize the target P, is generated as follows. The set $S^A$ is composed of synthetic images $I^A_{ij}$, where each such synthetic image $I^0_{ij}$ is produced by morphing $I_0$ by an amount $\theta^A$ toward $D^{TR}_j$ through application of the operator $M_i$. Two examples of borderline acceptable images are shown in the second row of FIG. 1.

A set of $S^U$ of generated images, which is developed to be mostly borderline unacceptable or unrecognizable by the expert H, is generated as follows. The set $S^U$ is composed of synthetic images $I^U_{ij}$, where each such synthetic image $I^O_{ij}$ is produced by morphing $I_0$ by an amount $\theta^U$ toward $D^{TR}_j$ through application of the operator $M_i$. Two examples of borderline unacceptable images are shown in the third row of FIG. 1.

Figure 2:
FIG. 2 is an illustrative grided image for use with the instant invention.

A classifier, such as a neural network, is provided. For example, a neural network is trained on a two class training set comprising a set of acceptable images $S^A$ and a set of unacceptable images $S^U$. For example, each image in the two class training set is input into the neural network by putting meshes on the images, thereby forming a cell array. An example of such a grided image is shown in FIG. 2. Each cell in the cell array corresponds to an input neuron in the neural network. For example, each image is divided into a 14×18 cell array so that each cell covers m by m pixels, where m is a small number, e.g., 1, 2, 3, or 4. The greater m is, the coarser the resolution of each pixel. The number of cells covering each image is the dimension of the pattern or image space. The number of input neurons in the neural network is the same as the number of cells, and the activity of the input neurons is the average gray-level value for a corresponding cell.

The trained neural network is then tested on the testing database images $D^{TS}_j$, $j \in N^{TS}$ and on new images of the target P, other than the original image $I_0$. That is, the neural network is checked to see whether it rejects all of the negative testing images, and accepts all of the positive testing images of P.

If the neural network fails to do so, then the two class training set comprising the set of acceptable images $S^A$ and the set of unacceptable images $S^U$ is either expanded by increasing $n^{TR}$, the number of training database images or by using more images of P. Then, the network will be trained on the expanded training set and retested. This process is repeated until the neural network is error-free or meets a satisfactory acceptance or rejection rate, as required by the use or application of the invention at hand.

In an embodiment of the invention, different portions of each image in the training database are described by multiple cell arrays, each cell array having cells comprising respective pixel arrays. This permits a resolution of a portion of an image described by m×m pixel cells that is different from a resolution of another portion of the image described by n×n pixel cells, wherein m≠n.

In an embodiment of this invention, instead of representing raw image data with pixels, the data are represented in a different space, for example, by using principal component analysis and feeding weights to input neurons in the neural network.

In an embodiment of the invention, if only one or very few images of the target P are available, then images of P under different lighting conditions, slightly different head poses and expressions are constructed out of the original image $I_0$. An exemplary technique for such constructions is found at "Synthetic Eyes," Kamgar-Parsi, et al., Proc. 4$^{th}$ International Conference on Audio- and Video-Based Biometric Person Authentication, pp. 412-420, Jun. 2003.

In an embodiment of the invention that identifies a plurality of targets, for example, on a "watch list," for each target in the "watch list," a corresponding classifier dedicated to the identification of that target is developed. That is, the classifier uniquely determines whether an image belongs to its target.

In alternative embodiments of the invention, an example of perturbation includes guided perturbation. In guided perturbation, an image of a target is perturbed toward an object or another legitimate image of a member of the same class of objects as the target. Another example includes use of morphing operators that accommodate image features, such as facial features, of different sizes in two images. By way of illustration, a nose in one image may be longer and broader than a nose in another image. Morphing, which involves cross-dissolving and assumes substantially similarly sized features, may generate an image of a deformed nose, whereas an embodiment of the invention includes a morphing operator that corresponds edges of the noses in both images. Examples of image morphing are disclosed in <http://www-cs.engr.ccny.cuny.edu/%7Ewolberg/diw.html>, George Wolberg, IEEE Computer Society Press <http://www.computer.org/cspress>, Los Alamitos, Calif., 1990, incorporated herein by reference. Additional examples of morphing are disclosed in Image Morphing: A Survey <http://www-cs.engr.ccny.cuny.edu/%7Ewolberg/abstracts.html#vc98>, George Wolberg, /Visual Computer/, vol. 14, pp. 360-372, 1998, incorporated herein by reference. Multiple morphs are also consistent with the instant invention; examples of multiple morphing is disclosed by Polymorph: Morphing Among Multiple Images/ IEEE Computer Graphics and Applications/, vol. 18, no. 1, pp. 58-71, Jan.-Feb. 1998, incorporated herein by reference.

In alternative embodiments of the invention, examples of the classifier include a neural network and a support vector machine. Examples of neural networks include feed-forward neural networks. Examples of feed-forward neural networks include multi-layer feed-forward neural networks, such as 3, 4, 5 or more layer feed-forward neural networks.

It is recognized that although the targets in the above description are faces of persons, in practice, the target is optionally a member of any class of interested objects. For example, targets include portions of persons.

Obviously, many modifications and variations of the instant invention are possible in light of the above teachings. It is therefore to be understood that the scope of the invention should be determined by referring to the following appended claims.

What is claimed is:

1. A method comprising:
   (a) providing an original image of a first target;
   (b) guidedly perturbing the original image towards a second, different target to generate a plurality of recognizable uniquely perturbed images, each of the plurality of recognizable uniquely perturbed images being recognizable as representing the first target and distinguishable from the original image;
   (c) guidedly perturbing the original image toward the second, different target to generate a plurality of unrecognizable uniquely perturbed images, each of the plurality of unrecognizable uniquely perturbed images being unrecognizable as representing the first target;
   (d) generating a contour between the plurality of recognizable uniquely perturbed images and the plurality of unrecognizable uniquely perturbed images;
   (e) guidedly perturbing the original image to generate a plurality of recognizable test set images;
   (f) guidedly perturbing the original image to generate a plurality of unrecognizable test set images; and
   (g) determining whether the contour excludes a first percentage of the plurality of unrecognizable test set images and includes a second percentage of the plurality of recognizable test set images.

2. The method according to claim 1, further comprising: providing a plurality of training images, wherein said guidedly perturbing step (c) is performed using the plurality of training images, and said guidedly perturbing step (b) is performed using the plurality of training images.

3. The method according to claim 1, wherein if the contour fails to one of exclude the first percentage of the plurality of unrecognizable test set images and include the second percentage of the plurality of recognizable test set images, the method further comprises:

increasing a number of the original image of the first target; and repeating steps (b) through (f).

4. The method according to claim 1, wherein said generating step (d) comprises:

training a classifier to define the contour.

5. The method according to claim 4, wherein said determining step (g) comprises:

testing the classifier.

6. The method according to claim 4, wherein the classifier comprises one of a neural network and a support vector machine.

7. The method according to claim 1, wherein the first target comprises a person.

8. The method according to claim 7, wherein the original image of the first target comprises a portion of the person.

9. The method according to claim 8, wherein the portion of the person comprises at least a portion of a face.

10. A method comprising:
(a) providing an original image of a first target;
(b) guidedly perturbing the original image towards a second, different target to generate a plurality of recognizable uniquely perturbed images, each of the plurality of recognizable uniquely perturbed images being recognizable as representing the first target and distinguishable from the original image;
(c) guidedly perturbing the plurality of recognizable uniquely perturbed images towards the second, different target to generate a plurality of unrecognizable uniquely perturbed images, each of the plurality of unrecognizable uniquely perturbed images being unrecognizable as representing the first target;
(d) generating a contour between the plurality of recognizable uniquely perturbed images and the plurality of unrecognizable uniquely perturbed images;
(e) guidedly perturbing the original image to generate a plurality of recognizable test set images;
(f) guidedly perturbing the plurality of recognizable test set images to generate a plurality of unrecognizable test set images; and
(g) determining whether the contour excludes a first percentage of the plurality of unrecognizable test images and includes a second percentage of the plurality of recognizable test images.

11. The method according to claim 10, further comprising: providing a plurality of training images,
wherein said guidedly perturbing step (c) is performed using the plurality of training images, and said guidedly perturbing step (b) is performed using the plurality of training images.

12. The method according to claim 11, wherein if the contour fails to one of exclude the first percentage of the plurality of unrecognizable test set images and include the second percentage of the plurality of recognizable test set images, the method further comprises:

increasing a number of the plurality of training images; and repeating steps (b) through (f).

13. The method according to claim 12, wherein said generating step (d) comprises:

training a classifier to define the contour.

14. The method according to claim 13, wherein said determining step (g) comprises:

testing the classifier.

15. The method according to claim 13, wherein the classifier comprises one of a neural network and a support vector machine.

16. The method according to claim 10, wherein the first target comprises a person.

17. The method according to claim 16, wherein, the original image of the first target comprises a portion of the person.

18. The method according to claim 17, wherein the portion of the person comprises at least a portion of a face.

* * * * *